United States Patent Office.

IMPROVEMENT IN TANNING.

JOSEPH W. CALEF, OF SALISBURY, NEW HAMPSHIRE, ASSIGNOR TO HIMSELF AND JOHN R. FOLSOM, OF STONEHAM, MASSACHUSETTS.

Letters Patent No. 60,472, dated December 18, 1866.

---

The Schedule referred to in these Letters Patent and making part of the same.

---

TO ALL WHOM IT MAY CONCERN:

Be it known that I, JOSEPH W. CALEF, of Salisbury, in the county of Merrimac, and State of New Hampshire, have invented an Improvement in Tanning Leather; and I do hereby declare that the following is a description of my invention, sufficient to enable those skilled in the art to practise it.

The invention relates to a quick and efficient method of tanning leather, and to the combination therewith of means for hardening and for preserving the leather.

The invention consists primarily in the employment of hard hack (spirea salicifolia) in combination with sumac, catechu, and Glauber salts, when used together in the manner and proportions to be hereinafter described; also, in combining borax with these ingredients for the purpose of hardening sole leather; also, in combining with the same, or other tanning composition, arsenic or an arsenical solution, for the purpose of preserving the leather.

In practising the invention, the procedure is as follows, supposing fifty skins to be the number to be tanned: To twenty-five gallons of water add twenty-five pounds of hard hack, and boil the infusion till the essential principles of the hard hack are well extracted; then add to this solution or extract ten pounds of sumac, boiling the mixture or not, as may be deemed advisable. To this mixture add gradually fifteen pounds of cutch and twelve pounds of Glauber salts, (the latter previously dissolved in water.) Into the vat that contains this mixture enter the fifty skins to be tanned, handling as usual, the cutch being gradually introduced, so as not to operate at once upon the skins with its full strength. Light skins are allowed to remain in this solution one to ten days, according to quality of stock: wax stock is to left in eight to ten days; sole leather, thirty to forty days. The addition of the hard hack to the other ingredients, the whole being used in the proportions substantially as set forth, imparts a softness and plumpness to the skins not otherwise attainable by any of the processes of tanning hitherto employed. In tanning sole leather, if to this solution be added one pound of borax, the result will be a material hardening of the body of the leather, while the surface remains soft and smooth; and by adding a half pound of arsenic, (previously dissolved,) the quality of the leather for durability is greatly increased, the arsenical solution penetrating the leather throughout, and preserving it in a pliable and soft condition until it is worn through by abrasion.

I claim, in the process of tanning, the employment of the ingredients first described, when used as and in the proportions substantially as set forth.

I also claim, in combination with said tanning ingredients, the employment of the material for hardening sole leather, substantially as set forth.

Also, the employment of the preservative solution in connection with the tanning process, substantially as set forth.

Witnesses:
  F. GOULD,
  M. W. FROTHINGHAM.

JOSEPH W. CALEF.